(12) United States Patent
Oyoshi (10) Patent No.: US 9,940,560 B2
(45) Date of Patent: Apr. 10, 2018

(54) IMAGE PROCESSING APPARATUS, INFORMATION PROCESSING METHOD, AND PROGRAM FOR HIGH SPEED ACTIVATION AND TERMINAL REDUCTION

(71) Applicant: CANON KABUSHIKI KAISHA, Tokyo (JP)

(72) Inventor: Kazuhiro Oyoshi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/710,449

(22) Filed: May 12, 2015

(65) Prior Publication Data

US 2015/0332133 A1 Nov. 19, 2015

(30) Foreign Application Priority Data

May 15, 2014 (JP) .................. 2014-101539

(51) Int. Cl.
| | | |
|---|---|---|
| *G06K 15/00* | (2006.01) | |
| *G06F 13/00* | (2006.01) | |
| *H04N 1/00* | (2006.01) | |
| *G06F 13/16* | (2006.01) | |

(52) U.S. Cl.
CPC ............ *G06K 15/40* (2013.01); *G06F 13/00* (2013.01); *G06F 13/1678* (2013.01); *H04N 1/00* (2013.01)

(58) Field of Classification Search
CPC .. G06F 12/0246; G06F 13/16; G06F 13/4022; G06F 3/0679; G06F 13/1678; G06F 13/00; G06F 9/4408; G06F 11/1417; G06F 21/575; G06F 2211/1097; G11C 11/5628; G11C 13/0069; G11C 29/022; G11C 11/1006; G11C 2207/107; G11C 7/10; G11C 7/1048; G11C 7/1075; G11C 8/00; G11C 8/18; G06K 15/40; G09G 2320/0252; G09G 2330/021; H04N 1/00
USPC .......................................... 711/102, 103, 105
See application file for complete search history.

(56) References Cited

U.S. PATENT DOCUMENTS

| | | | | |
|---|---|---|---|---|
| 5,592,684 A | * | 1/1997 | Gaskins | ............ G06F 13/4059 710/29 |
| 6,513,113 B1 | * | 1/2003 | Kobayashi | ............ G06F 9/4408 711/103 |
| 8,595,410 B2 | * | 11/2013 | Nagadomi | .......... G06F 12/0246 711/103 |

(Continued)

FOREIGN PATENT DOCUMENTS

JP 2004-192051 A 7/2004

OTHER PUBLICATIONS

English Machine Translation of JP 2004-192051-A (Takeuchi, Published Jul. 8, 2004).*

*Primary Examiner* — Benny Q Tieu
*Assistant Examiner* — Juan M Guillermety
(74) *Attorney, Agent, or Firm* — Canon U.S.A., Inc. IP Division (57) ABSTRACT

An image processing apparatus having a storage device includes a switching unit configured to switch a bus width of a data bus of the storage device between at a time of activation of the image processing apparatus, and after the image processing apparatus is activated, and a shared terminal switching unit configured to switch a shared terminal shared between an I/O port and the data bus of the storage device, to an I/O side after the activation.

10 Claims, 5 Drawing Sheets

(56) References Cited

U.S. PATENT DOCUMENTS

| | | | | |
|---|---|---|---|---|
| 2003/0037085 A1* | 2/2003 | Sandbote | ............ | G06F 9/30014 708/490 |
| 2004/0003212 A1* | 1/2004 | Mitsuishi | ............ | G06F 9/30032 712/229 |
| 2007/0266202 A1* | 11/2007 | Mukaida | ................ | G06F 9/4401 711/103 |
| 2008/0201564 A1* | 8/2008 | Mitsuishi | ............ | G06F 9/30032 712/238 |
| 2008/0294945 A1* | 11/2008 | Kubota | ................. | G06F 11/073 714/48 |
| 2012/0066432 A1* | 3/2012 | Miura | ................... | G06F 3/0688 711/102 |
| 2015/0134942 A1* | 5/2015 | Novak | .................. | G06F 21/575 713/2 |
| 2015/0324120 A1* | 11/2015 | Wu | ....................... | G06F 3/0679 711/103 |
| 2016/0154700 A1* | 6/2016 | Tian | .................... | G06F 11/1417 714/15 |

* cited by examiner

IMAGE PROCESSING APPARATUS, INFORMATION PROCESSING METHOD, AND PROGRAM FOR HIGH SPEED ACTIVATION AND TERMINAL REDUCTION

BACKGROUND OF THE INVENTION

Field of the Invention

The present invention relates to an image processing apparatus, an information processing method, and a program.

Description of the Related Art

In a controller of an image forming apparatus, a plurality of memories is often used. For example, a not-and (NAND) flash memory is used to store a boot program, and a serial not-or (NOR) flash memory is used to temporarily store data.

Moreover, a system-on-a-chip (SOC) can incorporate a larger number of circuits as integration density of a semiconductor integrated circuit has been increased. However, if the number of terminals is increased, a package size becomes large, causing an increase in costs.

Thus, a terminal for a dedicated-circuit is often shared with a general-purpose input/output (I/O) port. When the dedicated circuit is not used, the terminal is used as the general-purpose I/O port. This method reduces the number of terminals of the SOC. Moreover, a terminal of a controller SOC may be shared between a built-in read only memory (ROM) and an external secure digital (SD) card. In such a case, when an apparatus is activated, the boot program for the activation can be switched to the program stored in the built-in ROM or the external SD card (see Japanese Patent Application Laid-Open No. 2004-192051).

Meanwhile, an embedded multimedia card (e-MMC) has recently become widespread as a memory device, and been used in various systems.

In the market environment which often requests for larger data storage and higher-speed operation, the memory device has been improved to respond to such requests.

The e-MMC has characteristics of having larger capacity and operating at higher-speed compared to a conventional memory device such as a NAND flash memory.

Moreover, the use of the e-MMC can not only dynamically change a data bus width at 8 bits, 4 bits and 1 bit, but also change a clock frequency.

According to the above-described technique, the terminal of the controller SOC can be shared between the built-in ROM and the external SD card, thereby reducing the number of terminals. However, high-speed activation cannot be achieved by such a technique.

SUMMARY OF THE INVENTION

The present invention is directed to activating an apparatus at high speed while reducing the number of terminals.

According to an aspect of the present invention, an image processing apparatus having a storage device includes a switching unit configured to switch a width of a data bus of the storage device between at a time of activation of the image processing apparatus, and after the image processing apparatus is activated, and a shared terminal switching unit configured to switch a shared terminal, which is shared between an I/O port and the data bus of the storage device, to an I/O port side after the activation.

Further features of the present invention will become apparent from the following description of exemplary embodiments with reference to the attached drawings.

DESCRIPTION OF THE EMBODIMENTS

Hereinafter, exemplary embodiments of the present invention are described with reference to drawings.

Figure 1:
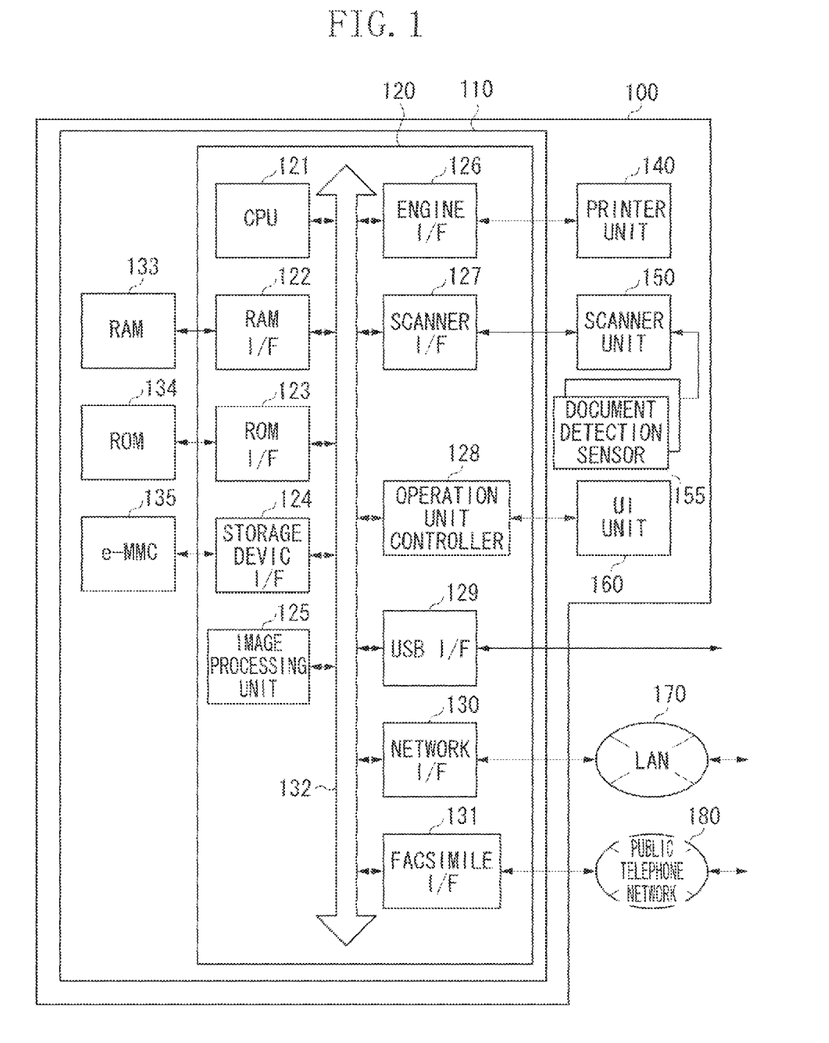
FIG. 1 is a diagram illustrating one example of a hardware configuration of an image forming apparatus.

FIG. 1 is a diagram illustrating one example of a hardware configuration of an image forming apparatus 100. In FIG. 1, a configuration of external environment is partially illustrated for convenience of explanation. The image forming apparatus 100 is described as one example of an image processing apparatus.

The image forming apparatus 100 includes a controller 110, a printer unit 140, a scanner unit 150, and a user interface (UI) unit 160. Each of these units operates in conjunction with one another, thereby providing printing, scanning, copying, and facsimile functions.

The controller 110 includes a controller SOC 120, a random access memory (RAM) 133, a ROM 134, and an e-MMC 135 as main components thereof.

The controller SOC 120 includes a central processing unit (CPU) 121 that comprehensively controls the image forming apparatus 100. The CPU 121 is connected to each unit of the controller SOC 120 via a system bus 132.

The RAM 133 is connected to the system bus 132 via a RAM I/F 122, and serves as a work memory for the CPU 121 to operate. The RAM 133 stores calculation data and various programs of the CPU 121.

Moreover, the RAM 133 is used as an image memory for storing image data on which various image processing is performed by an image processing unit 125 when printing is performed.

The ROM 134 is connected to the system bus 132 via a ROM I/F 123, and stores programs, image data, and setting data that are used by the CPU 121 of the image forming apparatus 100.

The e-MMC 135 is connected to the system bus 132 via a storage device I/F 124, and serves as a secondary nonvolatile storage device for storing programs and data in a large size.

The large-size programs and data, which are stored in the e-MMC 135, are loaded to the RAM 133 and then used.

The scanner unit 150 reads a document. The printer unit 140 prints print data on a sheet. The UI unit 160 is used when a user performs various setting operations for the image forming apparatus 100. The UI unit 160 also displays a message including an alarm.

The scanner unit 150 is connected to document detection sensors 155 for detecting a document. The document detection sensors 155 are arranged in each of a pressing plate (a platen glass of the scanner unit 150) and an auto document feeder (ADF).

When a user places a document on the platen glass, the document detection sensor 155 of the pressing plate detects that the document has been placed, and notifies the scanner unit 150 accordingly.

When a user places a document on a feeder, the document detection sensor 155 of the ADF detects that the document has been placed, and notifies the scanner unit 150 accordingly.

Moreover, the controller 110 and the scanner unit 150 perform data communication via a scanner I/F 127.

Upon receipt of a command from the controller 110, the scanner unit 150 optically reads a document image to convert the read image into image data, and transmits the image data to the controller 110.

The printer unit 140 performs data communication via an engine I/F 126.

Upon receipt of data from the controller 110, the printer unit 140 feeds a sheet to print the image data on the sheet, and discharges the printed sheet.

The UI unit 160 performs data communication via an operation unit controller 128.

The operation unit controller 128 may be included in the UI unit 160.

The controller 110 can communicate with external devices via the respective external I/Fs.

A universal serial bus (USB) I/F 129 is locally connected to an information device such as a personal computer (PC) via a USB connector to communicate with each other. Hereinafter, the information device is referred to as a PC.

A network I/F 130 is connected to a local area network (LAN) 170 via a LAN I/F connector. This enables the network I/F 130 to perform network communication with the PC at a communication destination.

A facsimile I/F 131 is connected to a public telephone network 180 via a modular jack, thereby transmitting and receiving a facsimile message to and from a facsimile machine at a communication destination.

When the CPU 121 executes processing based on a program stored in the ROM 134 or the e-MMC 135, functions (described below) of the image forming apparatus 100 and processing described in a flowchart (described below) are realized.

Figure 2:
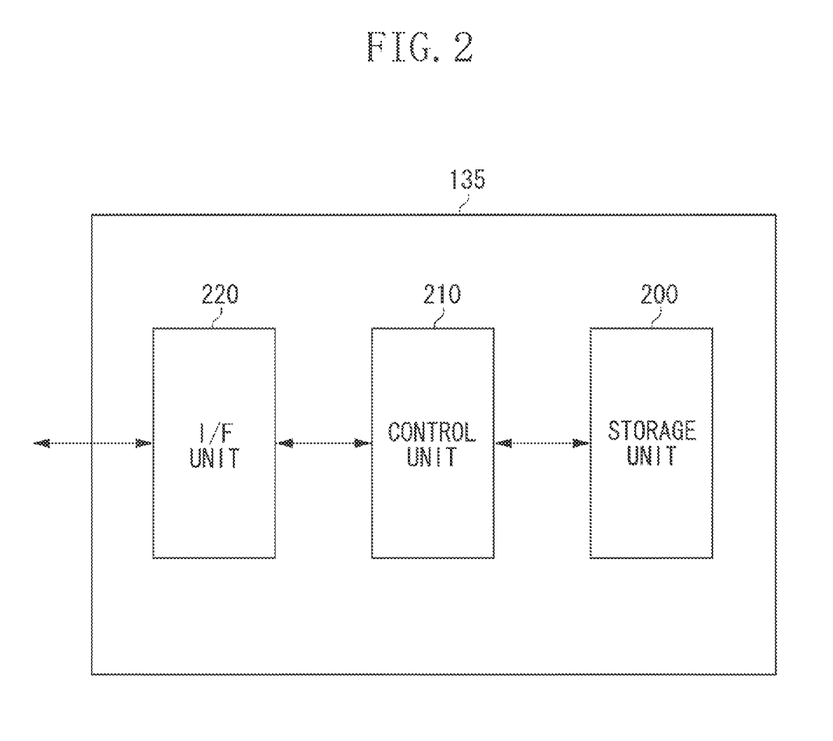
FIG. 2 is a diagram illustrating one example of a hardware configuration of an embedded multimedia card (e-MMC).

FIG. 2 is a diagram illustrating one example of a hardware configuration of the e-MMC 135.

The e-MMC 135 is an external storage device that conforms to the standards defined by Joint Electron Device Engineering Council (JEDEC) for built-in apparatus.

A package of the e-MMC 135 includes a NAND flash memory as a storage unit 200, and is controlled by a control unit 210. The control unit 210 has a bad block management function for the NAND flash memory.

An I/F unit 220 is connected to an external device using the same interface as a multimedia card (MMC) that is one of standards for memory cards. However, the I/F unit 220 is defined to be directly mounted on a substrate for built-in apparatus.

Figure 3:
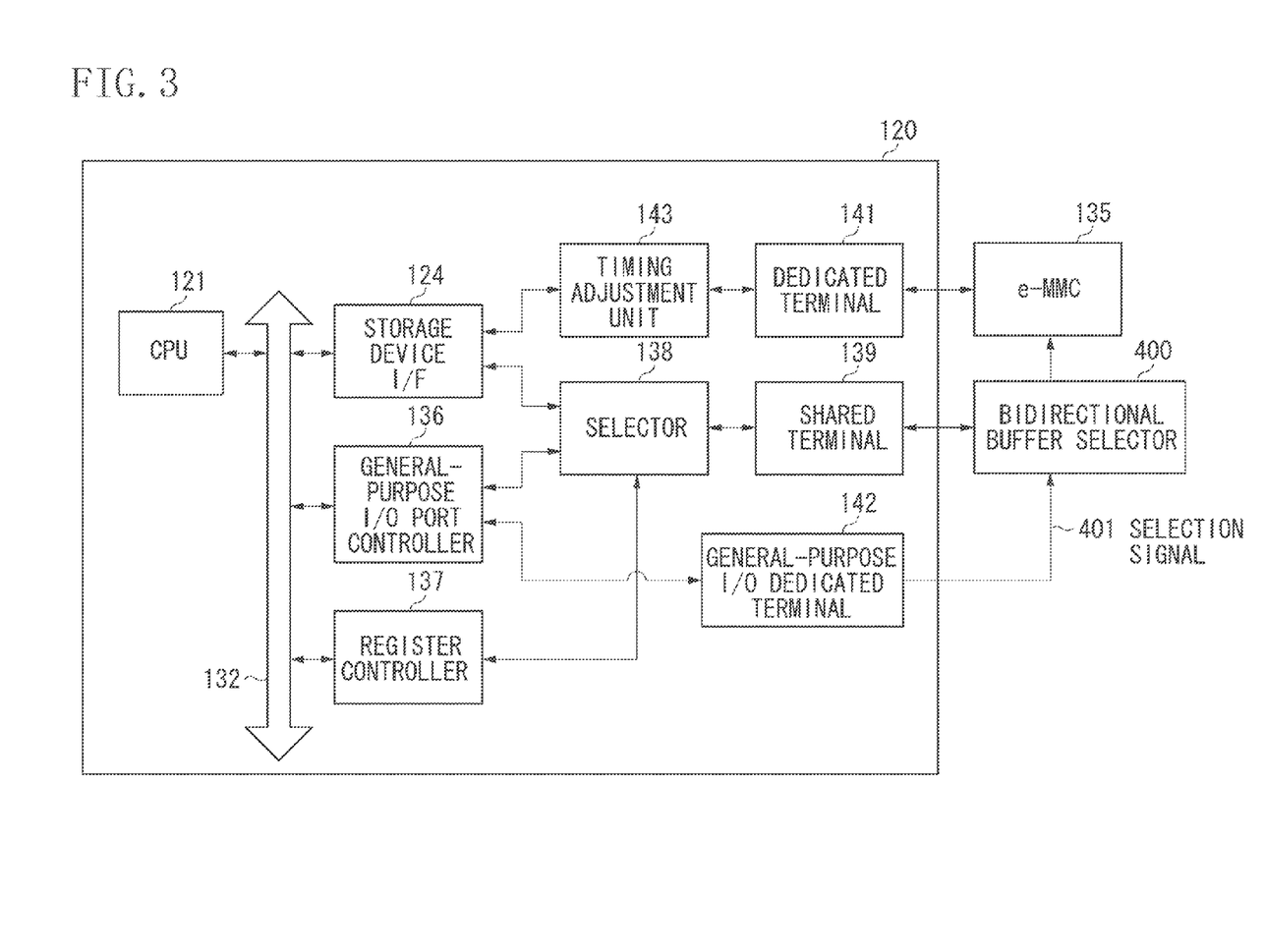
FIG. 3 is a diagram illustrating one example of a hardware configuration of a dedicated terminal and a shared terminal relating to a storage device interface (I/F).

FIG. 3 is a diagram illustrating one example of a hardware configuration of a dedicated terminal 141 and a shared terminal 139 relating to the storage device I/F 124 of the controller SOC 120.

The storage device I/F 124 serves as an interface for connecting the e-MMC 135 to the controller SOC 120. Moreover, the storage device I/F 124 is configured to utilize an unused terminal as a general-purpose I/O port when the e-MMC 135 is used which has switched its data bus width to 1 bit or 4 bits.

A general-purpose I/O port controller 136 is connected to the CPU 121 via the system bus 132. The general-purpose I/O port controller 136 operates as an input port and an output port under the control of the CPU 121. A register controller 137 is connected to the CPU 121 via the system bus 132. The register controller 137 operates as a register under the control of the CPU 121.

A selector 138 selects either a signal line of the storage device I/F 124 or a signal line of the general-purpose I/O port controller 136 to connect to the shared terminal 139. The selector 138 makes such a selection according to a value set in the register controller 137 under the control of the CPU 121.

A timing adjustment unit 143 adjusts timing of the signal line of the storage device I/F 124. The timing adjustment unit 143 performs timing adjustment between a signal line to be connected to the shared terminal 139 and a signal line to be connected to the dedicated terminal 141.

The dedicated terminal 141 is connected to RST_n, CLK, CMD, and D0 of the storage device I/F 124. These signal lines are directly connected to a terminal of the e-MMC 135.

Either D1 through D7 of the storage device I/F 124 or I/O ports 1 through 7 are selected and connected to the shared terminal 139. These signal lines are connected to a terminal of the e-MMC 135 via a bidirectional buffer selector 400.

A general-purpose I/O dedicated terminal 142 is connected to a signal line from the general-purpose I/O port controller 136. For example, the general-purpose I/O dedicated terminal 142 is used as an output port when outputting a selection signal 401 to the bidirectional buffer selector 400. In another case, the general-purpose I/O dedicated terminal 142 is used as an input port or an output port connected to the UI unit 160.

Figure 4:
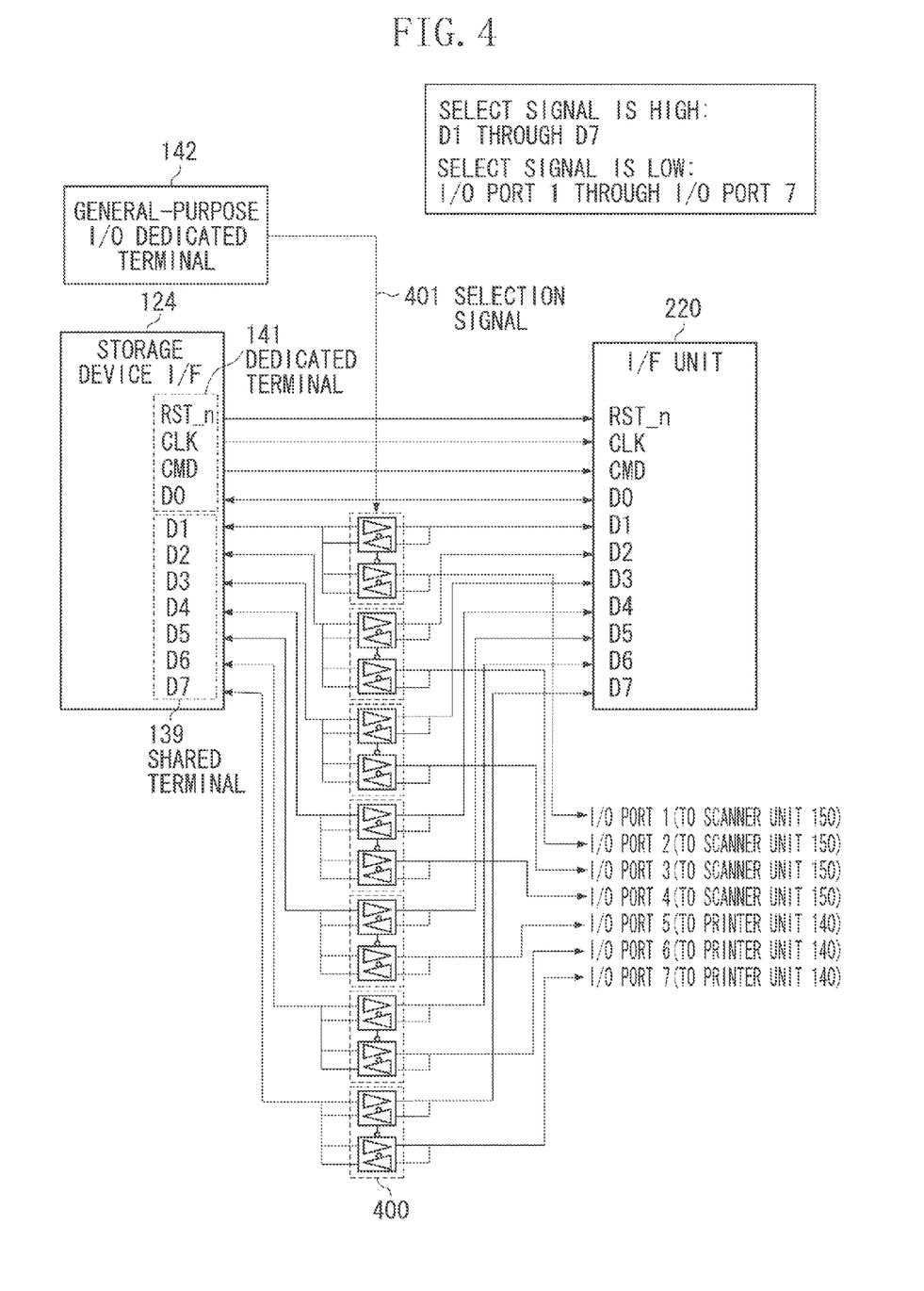
FIG. 4 is a connection diagram illustrating connections of a controller which is a system-on-a-chip (SOC), with the e-MMC and an input output (I/O) port.

FIG. 4 is a connection diagram illustrating connections of the controller SOC 120 with the e-MMC 135 and I/O ports.

In example connections illustrated in FIG. 4, the controller SOC 120 and the e-MMC 135 are connected by signal lines each having a data bus width of 8 bits. D1 through D7 of data buses serving as shared terminals are connected to the e-MMC 135 via the bidirectional buffer selector 400. The I/O ports are also connected to the shared terminals 139 via the bidirectional buffer selector 400. If the selection signal 401 is high, the e-MMC 135 side is selected. If the selection signal 401 is low, the I/O port side is selected. The selection signal 401 is output from the general-purpose I/O dedicated terminal 142 serving as a general-purpose output port.

Each of the I/O ports 1 through 4 is used as a signal line of the scanner unit 150, whereas each of the I/O ports 5 through 7 is used as a signal line of the printer unit 140. Thus, these I/O ports 1 through 7 are used as input ports or output ports.

Accordingly, when the e-MMC 135 is used in 1-bit mode, the shared terminals 139 can be used as I/O ports.

Figure 5:
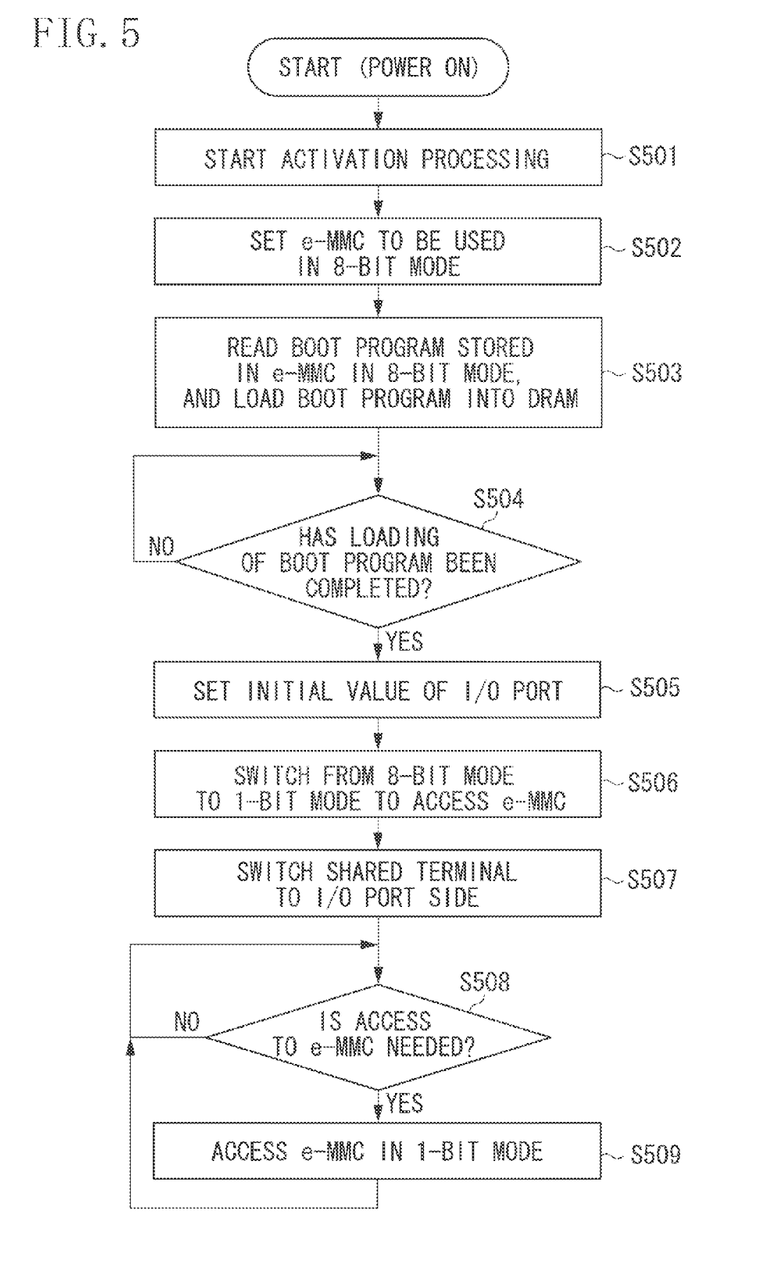
FIG. 5 is a flowchart illustrating one example of information processing performed when a controller of the image forming apparatus is activated.

FIG. 5 is a flowchart illustrating one example of information processing performed when the controller 110 of the image forming apparatus 100 gets activated.

The processing of the flowchart illustrated in FIG. 5 is executed by the CPU 121 inside the controller SOC 120 of the controller 110.

In step S501, when power is turned on, the CPU 121 starts activation processing.

Subsequently, in step S502, the CPU 121 sets the e-MMC 135 to be used in 8-bit mode.

The CPU 121 is designed to access the e-MMC 135 at a predetermined clock speed and with a predetermined data bus width (8 bits) when the power is turned on. The CPU 121 performs the processing based on such settings.

In step S503, the CPU 121 reads a boot program stored in a predetermined boot area of the e-MMC 135 at a predetermined clock speed and with a predetermined data bus width (8 bits) to load the boot program into the RAM 133, thereby executing the program.

In step S504, the CPU 121 determines whether the loading of the boot program has been completed. If the CPU 121 determines that the loading of the boot program has been completed (YES in step S504), the processing proceeds to step S505. In step S505, the CPU 121 sets an input/output value and an initial value of the I/O port according to the program.

Subsequently, in step S506, the CPU 121 changes the data bus width to access the e-MMC 135 from the 8-bit mode to 1-bit mode that uses fewer bits.

In step S507, the CPU 121 switches the shared terminal 139 to the I/O port side. Thus, the CPU 121 not only uses the e-MMC 135 in the 1-bit mode, but also uses the shared terminal 139 as an I/O port. The processing in step S507 is one example of shared terminal switching processing.

In step S508, the CPU 121 determines whether to access the e-MMC 135. If the CPU 121 accesses the e-MMC 135 (YES in step S508), the CPU 121 uses the e-MMC 135 in the 1-bit mode during the system activation.

According the present exemplary embodiment, when the image forming apparatus 100 is activated, a boot program is loaded in 8-bit mode with respect to the data bus width of the e-MMC 135. Thus, the image forming apparatus 100 can be activated at high speed.

After the image forming apparatus 100 is activated, the e-MMC 135 is used in which the data bus width is switched to the 1-bit mode. Moreover, a port of the controller SOC 120, which is shared with the data bus of the e-MMC 135, is switched such that an I/O port side is used.

Accordingly, the image forming apparatus 100 can be activated at high speed, and the number of terminals of the controller SOC 120 can be reduced.

According to the present exemplary embodiment, therefore, both of high-speed activation of the apparatus and reduction in the number of terminals can be achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-101539, filed May 15, 2014, which is hereby incorporated by reference herein in its entirety.

What is claimed is:

1. An image processing apparatus, comprising:
a memory device in which a boot program is stored;
a random access memory (RAM);
a scanner that scans an image on a document to generate image data;
a printer that performs printing on a basis of the image data;
an interface for connecting the memory device and including a dedicated terminal and a shared terminal, a first signal line and a second signal line being connected to the dedicated terminal, either one of a third signal line and a fourth signal line being selectively connected to the shared terminal, the first signal line being a line for communication of a control signal with the memory device, the second signal line being a line for communication of data with the memory device, the third signal line being a line for communication of data with the memory device, and the fourth signal line being a line for communication with the scanner or the printer; and
at least one processor that executes a set of instructions to:
in response to initiation of activating the image processing apparatus:
connect the third signal line to the shared terminal,
read the boot program stored in the memory device by using both the second signal line and the third signal line, and
load the read boot program into the RAM;
connect the fourth signal line to the shared terminal upon completion of the loading of the boot program; and
access the memory device by using the second signal line without using the third signal line during the activation of the image processing apparatus after connecting the fourth signal line to the shared terminal.

2. The image processing apparatus according to claim 1, wherein the second signal line is used for communicating 1-bit data with the memory device.

3. The image processing apparatus according to claim 2, wherein it is possible to communicate data of plural bits with the memory device by using the second signal line and the third signal line.

4. The image processing apparatus according to claim 3, wherein the plural bits are 8 bits.

5. The image processing apparatus according to claim 1, wherein the memory device is an e-MMC.

6. A method, implemented at an image processing apparatus having a memory device in which a boot program is stored, a random access memory (RAM), a scanner configured to scan an image on a document to generate image data, a printer configured to perform printing on a basis of the image data, and an interface for connecting the memory device and including a dedicated terminal and a shared terminal, a first signal line and a second signal line being connected to the dedicated terminal, either one of a third signal line and a fourth signal line being selectively connected to the shared terminal, the first signal line being a line for communication of a control signal with the memory device, the second signal line being a line for communication of data with the memory device, the third signal line being a line for communication of data with the memory device, and the fourth signal line being a line for communication with the scanner or the printer, the method comprising:

in response to initiation of activating the image processing apparatus:
connecting the third signal line to the shared terminal;
reading the boot program stored in the memory device by using both the second signal line and the third signal line; and loading the read boot program into the RAM;
connecting the fourth signal line to the shared terminal upon completion of the loading of the boot program; and
accessing the memory device by using the second signal line without using the third signal line during the activation of the image processing apparatus after connecting the fourth signal line to the shared terminal.

7. The method according to claim 6, wherein the second signal line is used for communicating 1-bit data with the memory device.

8. The method according to claim 7, wherein it is possible to communicate data of plural bits with the memory device by using the second signal line and the third signal line.

9. The method according to claim 8, wherein the plural bits are 8 bits.

10. The method according to claim 6, wherein the memory device is an e-MMC.

* * * * *